United States Patent
Jägenstedt et al.

(10) Patent No.: US 10,842,074 B2
(45) Date of Patent: Nov. 24, 2020

(54) OPERATION OF A ROBOTIC WORK TOOL BY ADAPTING THE OPERATION TO WEATHER CONDITIONS

(71) Applicant: HUSQVARNA AB, Huskvarna (SE)

(72) Inventors: Patrik Jägenstedt, Tenhult (SE); Tom Söberg, Blidsberg (SE); Magnus Öhrlund, Malmbäck (SE); Andreas Källming, Tansås (SE); Fredrik Kallström, Huskvarna (SE); Jonas Holgersson, Huskvarna (SE); Mattias Kamfors, Jönköping (SE); Johan Öster, Lekeryd (SE)

(73) Assignee: HUSQVARNA AB, Huskvarna (SE)

( * ) Notice: Subject to any disclaimer, the term of this patent is extended or adjusted under 35 U.S.C. 154(b) by 406 days.

(21) Appl. No.: 15/537,437

(22) PCT Filed: Nov. 26, 2015

(86) PCT No.: PCT/EP2015/077848
§ 371 (c)(1),
(2) Date: Jun. 19, 2017

(87) PCT Pub. No.: WO2016/102144
PCT Pub. Date: Jun. 30, 2016

(65) Prior Publication Data
US 2018/0213717 A1    Aug. 2, 2018

(30) Foreign Application Priority Data

Dec. 23, 2014 (SE) .................................. 14516488

(51) Int. Cl.
*A01D 34/00* (2006.01)
*G01W 1/16* (2006.01)
(Continued)

(52) U.S. Cl.
CPC ............. *A01D 34/008* (2013.01); *G01W 1/16* (2013.01); *G05D 1/021* (2013.01); *G05D 1/0274* (2013.01);
(Continued)

(58) Field of Classification Search
CPC .... A01D 34/008; A01D 34/00; G05D 1/0274; G05D 2201/0208; G05D 1/021;
(Continued)

(56) References Cited

U.S. PATENT DOCUMENTS 4,919,224 A * 4/1990 Shyu ..................... A01D 34/008
                                                    180/168
5,388,022 A * 2/1995 Ahuja ....................... H02H 3/06
                                                    361/111
(Continued)

FOREIGN PATENT DOCUMENTS

EP        2342964 A1    7/2011
GB        2358843 A     8/2001
(Continued)

OTHER PUBLICATIONS

International Search Report and Written Opinion for International Application No. PCT/EP2015/077848 dated Feb. 17, 2016, all enclosed pages cited.

(Continued)

*Primary Examiner* — Genna M Mott
(74) *Attorney, Agent, or Firm* — Burr & Forman, LLP

(57) ABSTRACT

A robotic work tool system (200) comprising further comprising a charging station (210) and a robotic work tool (100), the robotic work tool system (200) being configured to determine a change in weather and to take preservation action. The robotic work tool may detect the change in weather by detecting an electrical charge buildup in the boundary wire. The robotic work tool may take the preser- (Continued)

vative action by the robotic work tool (100) distancing itself from the charging station (210).

20 Claims, 3 Drawing Sheets

(51) Int. Cl.
  *G05D 1/02* (2020.01)
  *A01B 79/00* (2006.01)
(52) U.S. Cl.
  CPC .... *A01B 79/005* (2013.01); *G05D 2201/0208* (2013.01)
(58) Field of Classification Search
  CPC ..... G05D 1/0225; A01B 79/005; G01W 1/10; B60W 2550/12
  See application file for complete search history.

(56) References Cited

U.S. PATENT DOCUMENTS

| | | | | |
|---|---|---|---|---|
| 2003/0023356 | A1* | 1/2003 | Keable | G05D 1/0219 |
| | | | | 701/23 |
| 2008/0039974 | A1* | 2/2008 | Sandin | G05D 1/0225 |
| | | | | 700/258 |
| 2010/0085197 | A1* | 4/2010 | Delia | G01W 1/00 |
| | | | | 340/601 |
| 2010/0299016 | A1* | 11/2010 | Benzler | E04H 4/1654 |
| | | | | 701/26 |
| 2013/0110322 | A1* | 5/2013 | Jagenstedt | A01B 79/005 |
| | | | | 701/2 |
| 2014/0167732 | A1* | 6/2014 | Mueller | G01W 1/16 |
| | | | | 324/72 |
| 2016/0109241 | A1* | 4/2016 | Eguchi | G05D 1/0265 |
| 2017/0175432 | A1* | 6/2017 | Dervitsiotis | G01W 1/00 |

FOREIGN PATENT DOCUMENTS

| | | |
|---|---|---|
| GB | 2386970 A | 10/2003 |
| WO | 0074465 A1 | 12/2000 |

OTHER PUBLICATIONS

International Preliminary Report on Patentability for International Application No. PCT/EP2015/077848 dated Jun. 27, 2017, all enclosed pages cited.

* cited by examiner

OPERATION OF A ROBOTIC WORK TOOL BY ADAPTING THE OPERATION TO WEATHER CONDITIONS

TECHNICAL FIELD

This application relates to a method and a robotic work tool system for an improved operation of a robotic work tool by adapting the operation to weather conditions.

BACKGROUND

Contemporary robotic work tools are becoming more and more advanced and as such they are also becoming more precious to their owners who want to protect their investments in their time saving robotic work tools. Many, if not most, robotic work tools operate outdoors and are thus exposed to the elements which increases the wear of a robotic work tool. For example, a robotic lawnmower may be set to operate only when the owner is not at home, so as not to disturb the owner. However, this also means that the robotic lawnmower is operating without supervision and will be unaware of the weather.

Many design measures (such as insulation and waterproofing) have been taken to improve the robustness of robotic work tools. However, such measures can only protect from the weather, not change the weather. Rain, for example, may both increase the wear of the robotic work tool (as the rain makes the ground more muddy and generally reduces the comfort at which the robotic work tool operates), but may also lead to an increase in cost as wet grass is harder to mow and wet grounds are usually also harder to traverse, leading to increase in power use and thus requiring more charges, increasing both the time needed for providing a satisfactory result and the cost for the increased power use.

There is thus a need for a manner of enabling reliable operation of a robotic work tool even in situations where the robotic work tool may not be able to operate at full capacity. It is also a need for a robotic work tool that is better protected against weather phenomena such as lightning. As most robotic work tools operate in open areas and are often electrically powered, lightning may be a particular problem.

SUMMARY

It is an object of the teachings of this application to overcome the problems listed above by providing a robotic work tool system comprising further comprising a charging station and a robotic work tool, the robotic work tool system being configured to determine a change in weather and to take preservative action.

The robotic work tool may detect the change in weather by detecting an electrical charge buildup in the boundary wire.

The robotic work tool may take the preservative action by the robotic work tool (100) distancing itself from the charging station (210).

In one embodiment the robotic work tool is a robotic lawnmower.

It is also an object of the teachings of this application to overcome the problems listed above by providing a method for use in a robotic work tool system comprising further comprising a charging station and a robotic work tool, the method comprising determining a change in weather and taking preservative action.

The inventors of the present invention have realized, after inventive and insightful reasoning that by using for example the boundary wire electrical charges in the atmosphere may be picked up. Such charges may be indicative of oncoming lightning and the robotic work tool can then take measures to be best protect itself against lightning.

The inventors of the present invention have realized, after inventive and insightful reasoning that by actually distancing the robotic work tool from the charging station instead of seeking shelter in the charging station, the robotic work tool is actually safer as the charging station may attract more lightning than the robotic work tool.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF DRAWINGS

The invention will be described in further detail under reference to the accompanying drawings in which.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
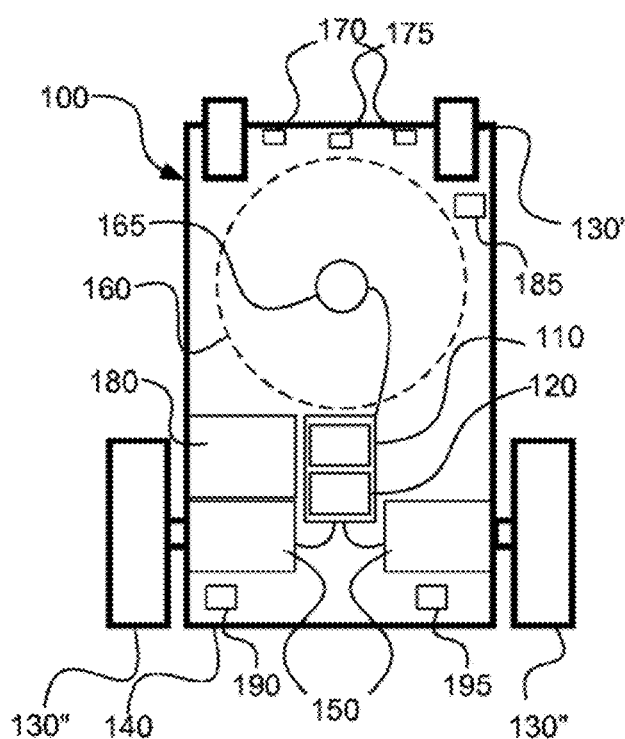
FIG. 1 shows a schematic overview of a robotic work tool according to one embodiment of the teachings of this application.

FIG. 1 shows a schematic overview of a robotic work tool 100 having a body 140 and a plurality of wheels 130. In the exemplary embodiment of FIG. 1 the robotic work tool 100 has 4 wheels 130, two front wheels 130' and the rear wheels 130". At least some of the wheels 130 are drivably connected to at least one electric motor 150. It should be noted that even if the description herein is focussed on electric motors, combustion engines may alternatively be used possibly in combination with an electric motor.

In the example of FIG. 1, the rear wheels 130" are connected to each an electric motor 150. This allows for driving the rear wheels 130" independently of one another which, for example, enables steep turning.

The robotic work tool 100 also comprises a controller 110. The controller 110 may be implemented using instructions that enable hardware functionality, for example, by using executable computer program instructions in a general-purpose or special-purpose processor that may be stored on a computer readable storage medium (disk, memory etc) 120 to be executed by such a processor. The controller 110 is configured to read instructions from the memory 120 and execute these instructions to control the operation of the robotic work tool 100. The controller 110 may be implemented using any suitable, publically available processor or Programmable Logic Circuit (PLC). The memory 120 may be implemented using any commonly known technology for computer-readable memories such as ROM, RAM, SRAM, DRAM, FLASH, DDR, SDRAM or some other memory technology.

The robotic work tool 100 further may have at least one sensor 170, in the example of FIG. 1 there are two sensors 170, arranged to detect a magnetic field (not shown). The sensors are connected to the controller 110 and the controller 110 is configured to process any signals received from the sensors 170. The sensor signals may be caused by the magnetic field caused by a control signal being transmitted through a boundary wire (for more details on charging stations, control signals and boundary wires, see the description below with reference to FIG. 2). This enables the controller 110 to determine whether the robotic work tool 100 is inside or outside an area enclosed by a boundary wire.

It should be noted that the teachings herein may also be used for a robotic work tool that is configured to operate in a work area, where the work area is not bounded by a boundary wire. Examples of such robotic work tools are tools arranged to physically detect a boundary by collision detection, or a robotic work tool that uses a position determination system (such as GNSS) to maintain a position within the work area, which work area is specified by coordinates.

The controller 110 is connected to the motors 150 for controlling the propulsion of the robotic work tool 100 which enables the robotic work tool 100 to service an enclosed area without leaving the area.

The robotic work tool 100 also comprises a work tool 160, which may be a grass cutting device, such as a rotating blade 160 driven by a cutter motor 165. The cutter motor 165 is connected to the controller 110 which enables the controller 110 to control the operation of the cutter motor 165. The controller is also configured to determine the load exerted on the rotating blade, by for example measure the power delivered to the cutter motor 165 or by measuring the axle torque exerted by the rotating blade. The robotic work tool 100 is, in one embodiment, a lawnmower robot. In one embodiment the robotic work tool 100 is a farming equipment. In one embodiment the robotic work tool 100 is a golf ball collecting tool.

The robotic work tool 100 may also be a vacuum cleaner, a floor cleaner, a street sweeper, a snow removal tool, a mine clearance robot or any other robotic work tool that is required to operate in a work area in a methodical and systematic or position oriented manner.

The robotic work tool 100 also has (at least) one battery 180 for providing power to the motors 150 and the cutter motor 165. Alternatively or additionally the robotic work tool may have a fuel tank 180 for supplying fuel to any other type of engine 150.

The robotic work tool 100 is also arranged with a position determining device 190, such as a GNSS (Global Navigation Satellite System) device 190. In one embodiment the GNSS device is a GPS (Global Positioning Service) device 190. The GNSS device 190 is connected to the controller 110 for enabling the controller 110 to determine a current position for the robotic work tool 100 using the GNSS device and to control the movements of the robotic work tool 100 based on the position.

Other examples of position determining devices 190 include optical (such as laser) position determining devices, other radio frequency position determining systems, and ultrawideband (UWB) beacons and receivers. The robotic work tool 100 is further arranged with at least one sensor 195 for providing signals for deduced reckoning navigation. Examples of such deduced reckoning navigation sensors 195 are odometers, accelerometers, gyroscopes and compasses.

The robotic work tool 100 also comprises an ambient pressure sensor, such as a barometer 185, for determining the ambient pressure.

The robotic work tool 100 may also comprise a communication interface 175. The communication interface 175 may be arranged to receive and transmit wireless signals through a radio frequency interface for communicating with a charging station (referenced 210 in FIG. 2). The communication interface 175 may alternatively or additionally be arranged to receive and possibly transmit signals through a boundary wire (referenced 250 in FIG. 2) for communicating with a charging station (referenced 210 in FIG. 2). In one embodiment the communication interface 175 is embodied by the sensors 170 providing signal readings that are interpreted by the controller 110.

The communication interface 175 may alternatively or additionally be arranged to communicate with a weather service provider, through for example an internet connection.

Figure 2:
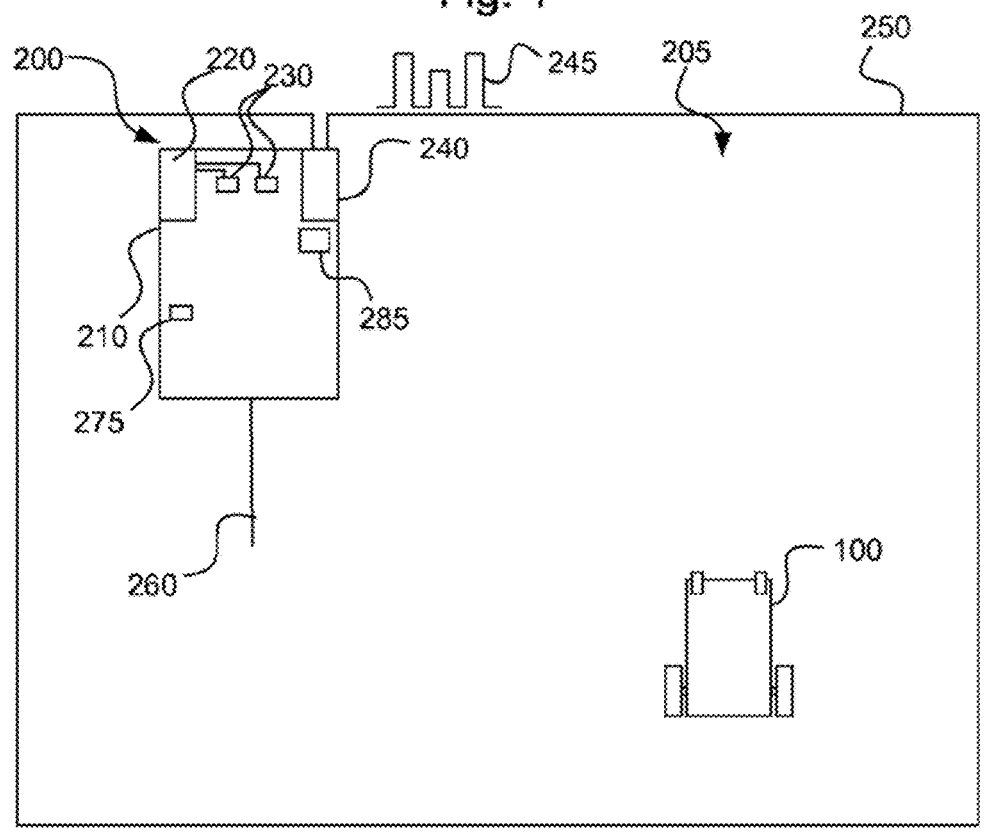
FIG. 2 shows a schematic view of a robotic working tool system according to one embodiment of the teachings of this application.

FIG. 2 shows a schematic view of a robotic work tool system 200 comprising a charging station 210 and a boundary wire 250 arranged to enclose a working area 205, the working area 205 not necessarily being a part of the robotic work tool system 200, in which the robotic work tool 100 is supposed to service. The charging station 210 has a charger 220 coupled to, in this embodiment, two charging plates 230. The charging plates 230 are arranged to co-operate with corresponding charging plates (referenced 235 in FIG. 3) of the robotic work tool 100 for charging the battery 180 of the robotic work tool 100. The charging station 210 also has, or may be coupled to, a signal generator 240 for providing a control signal 245 to be transmitted through the boundary wire 250. The control signal preferably comprises a number of periodic current pulses. As is known in the art, the current pulses will generate a magnetic field around the boundary wire 250 which the sensors 170 of the robotic work tool 100 will detect. As the robotic work tool 100 (or more accurately, the sensor 170) crosses the boundary wire 250 the direction of the magnetic field will change. The robotic work tool 100 will thus be able to determine that the boundary wire has been crossed. The use of more than one sensor 170 enables the controller 110 of the robotic work tool 100 to determine how the robotic work tool 100 is aligned with relation to the boundary wire 250 by comparing the sensor signals received from each sensor 170. This enables the robotic work tool to follow the boundary wire 250, for example when returning to the charging station 210 for charging.

Optionally, the charging station 210 also has a guide cable 260 for enabling the robotic work tool to find the entrance of the charging station 210. In one embodiment the guide cable 260 is formed by a loop of the boundary wire 250. In one embodiment the guide wire 260 is used to generate a magnetic field for enabling the robotic work tool 100 to find the charging station without following a guide cable 260.

The charging station 210 may also comprise a barometer 285, for determining an ambient atmospheric pressure.

The charging station 210 may also comprise a communication interface 275. The communication interface 275 may be arranged to receive and transmit wireless signals through a radio frequency interface for communicating with the robotic work tool 100. The communication interface 275 may alternatively or additionally be arranged to receive and possibly transmit signals through the boundary wire 250 for communicating with the robotic work tool 100.

The communication interface 175 may alternatively or additionally be arranged to communicate with a weather service provider, through for example an internet connection.

Figure 3:
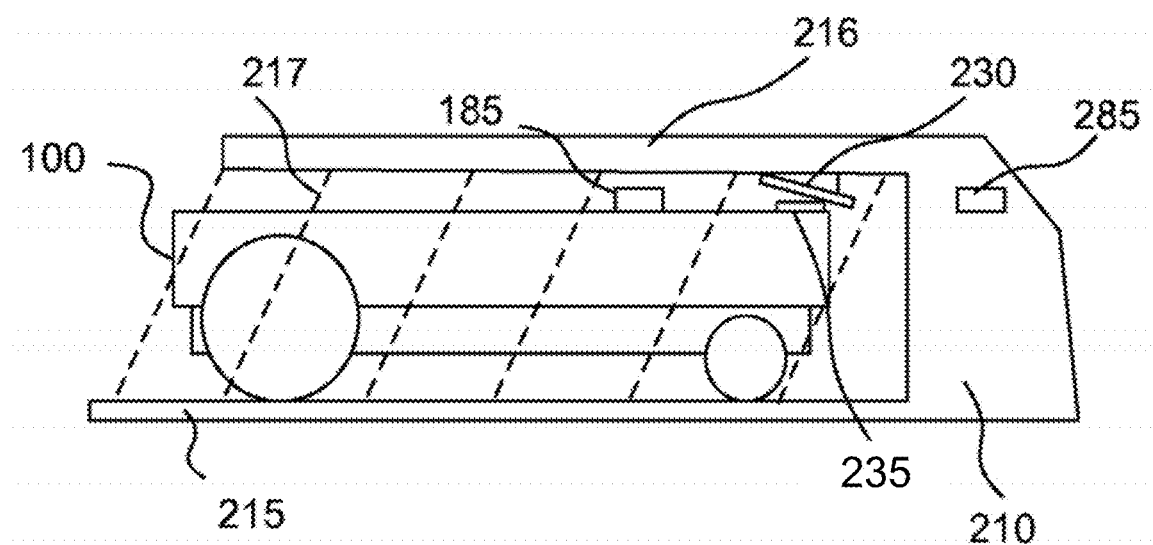
FIG. 3 shows a schematic side view of a robotic working tool system according to one embodiment of the teachings of this application.

FIG. 3 shows a schematic view of a robotic work tool system 200 according to the teachings herein, such as the robotic work tool system 200 of FIG. 2, being depicted here in a side view. The charging station 210 may be arranged with a plate 215 which the robotic work tool 100 enters partially or completely when docking in the charging station 210. The use of a charging station plate 215 helps protect the robotic work tool 100 by providing a dry platform. Furthermore, the charging station may be arranged with a roofing portion 216 providing protective sheltering for the robotic work tool 100. The charging station 210 may also be arranged with protective side portions 217 indicated by dashed lines in FIG. 3.

The robotic work tool may thus be arranged to seek protection in for example such a charging station upon detecting a change in weather. As a detection of charge build up (more on this below) is detected, the robotic work tool may also seek protection in any charging station.

Figure 4:
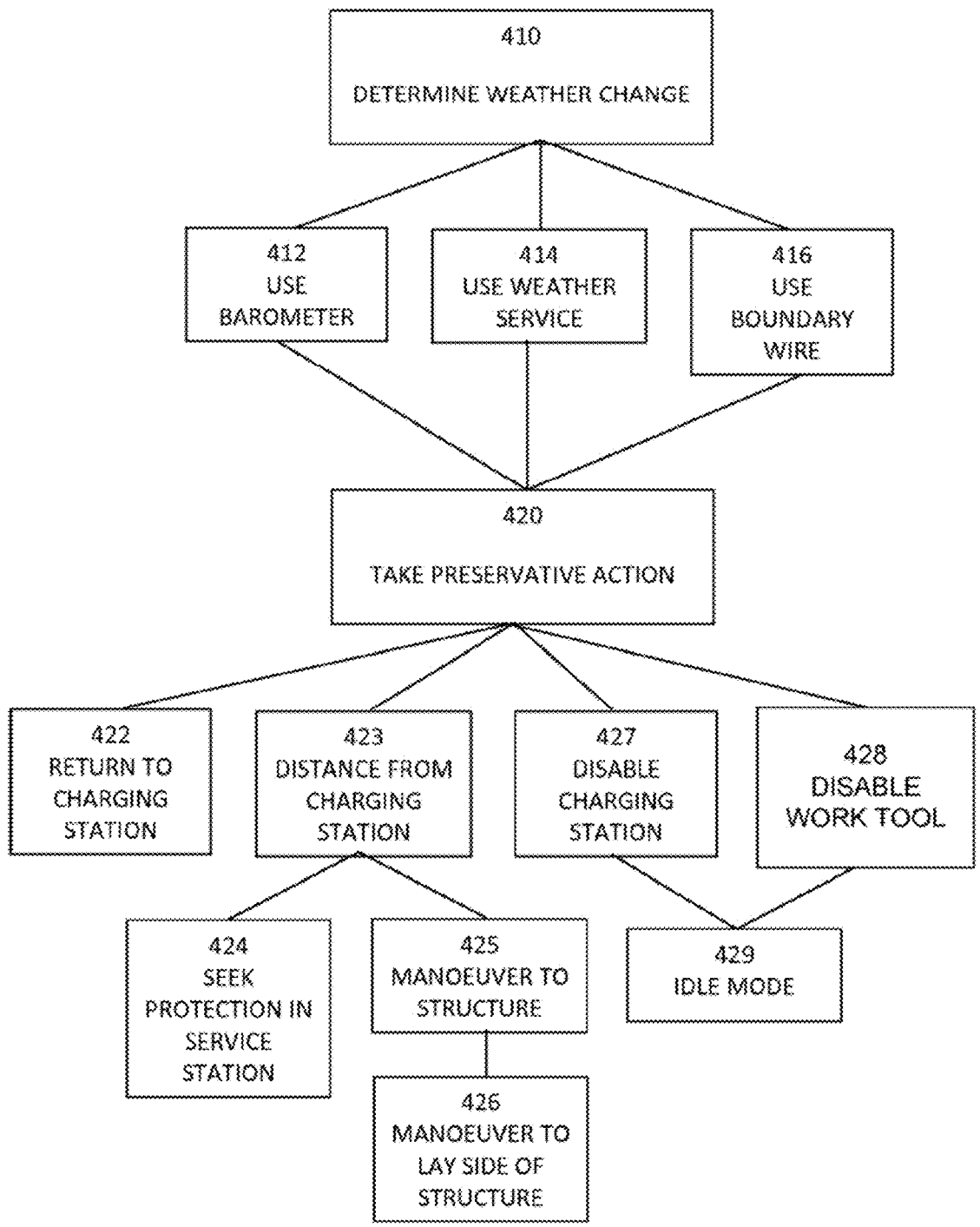
FIG. 4 shows a flowchart for a method for use in a robotic working tool system according to one embodiment of the teachings of this application.

FIG. 4 shows a flowchart for a general method for controlling a robotic work tool 100 and/or a robotic work tool system 200 according to the teachings herein.

The robotic work tool 100 is configured to determine a change in weather 410. The change in weather and also the resulting operation may be determined by the robotic work tool 100, or by the charging station 210 and communicated to the robotic work tool 100 through the respective communication interfaces 175 and 275 respectively. If one or more determinations are made by the charging station or other device part of the robotic work tool system, the controller 110 of the robotic work tool 100 is said to make the determination by receiving it from the charging station 210, and vice versa. In the following we will focus on the robotic work tool 100 performing the determinations, but it should be noted that the charging station may also or alternatively perform some or all determinations. There will be made no distinction herein between which device performs which determination.

The change in weather may be determined through the use 412 of the barometer 185/285, where a drop in pressure would indicate a low pressure front approaching meaning a worsening of the weather. Similarly, an increase in pressure would indicate a high pressure front approaching. If both the robotic work tool and the charging station are equipped with each a barometer, both barometers 185/285 need to show approximately the same change in pressure for any weather related actions to be performed. If only the barometer 185 of the robotic work tool 100 detects a change, this may only indicate a change in elevation. However, if the barometer 285 of the charging station 210 detects a change in pressure, this would indicate a change in weather.

The change in weather may be determined through receiving information from a weather service 414, possibly through an internet connection or a dial up connection provided by the communication interface 175/275.

The change in weather may be determined 416 through the boundary wire 250. The charging station 210 may be arranged to sense changes in local atmospheric electric charge picked up by the boundary wire 250. Alternatively or additionally, the same changes or build-ups in electric charges may be picked up by the sensors 170 on the robotic work tool 100.

As a thunder storm or other lightning weather is approaching there will be a buildup in electrical charges. These charges are of a small but detectable amplitude as is evidenced by the operation of a Franklin's lightning bell, where metal balls are charged by the atmospheric charges. The inventors have come to the insightful revelation that the boundary wire, having a wide circumference, can be utilized to detect these charge build-ups. As a charge is build up, it will spread through the boundary wire and be detectable at the charging station 210. Or, they may be detected by the robotic work tool 100 as described above.

As it is determined that a change in weather is imminent, the robotic work tool may take action 420 to prevent any increased wear or risk of damage.

One such action for the robotic work tool 100 to take is to return 422 to the charging station 210.

Another such action for the robotic work tool 100 to take is to distance 423 itself from the charging station 210 in case the charging station 210 is struck by a lighting hit thereby preventing the robotic work tool from becoming collateral damage. Alternatively, the robotic work tool may seek protection 424 in a service area remote from the charging station 210.

If the robotic work tool 100 is arranged with a map of the work area 205 possibly indicating elevations, the robotic work tool may seek protection from any lighting hits by manoeuvring 425 close to a high or tall structure such as a house. Houses are usually equipped with lighting rods so a robotic work tool 100 would be relatively safe next to such a structure. The robotic work tool may manoeuvre to the structure using any of the positioning devices 190/195 it is arranged with.

If the robotic work tool 100 is arranged to receive precise weather details, such as through a weather service, it may seek protection 426 on a side of a structure, thereby being sheltered from both rain and wind (blowing debris).

Another or alternative action is to disable 427 the charging station 210 to prevent that the charging station 210 is struck or hurt by a lightning hit, possibly propagated through the boundary wire.

Another or alternative action is to disable 428 the robotic work tool 100 to prevent that the robotic work tool 100 is struck or hurt by a lightning hit.

If any of the robotic work tool or the charging station is disabled it may be put in an idle mode 429 and be arranged to wake up at intervals to detect changes in weather or when receiving a wake up signal from the other of the robotic work tool or the charging station.

It should be noted that any of the preservative actions may be combined, for example, a robotic work tool 100 may distance itself from the charging station and then disable itself.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A robotic work tool system comprising:
a charging station;
a robotic work tool comprising magnetic field detection sensors; and
a boundary wire operably coupled to the charging station and arranged to enclose a working area of the robotic work tool;
wherein the robotic work tool is configured to:
detect, by the magnetic field detection sensors, periodic current pulses in the boundary wire and an electrical charge buildup in the boundary wire beyond a charge threshold, detection of the periodic current pulses in the boundary wire being used for determining a position of the robot work tool relative to the boundary wire and detection of the electrical charge buildup in the boundary wire beyond the charge threshold being indicative of a change in weather; and
in response to detection of the electrical charge buildup in the boundary wire beyond the charge threshold, take a preservative action.

2. The robotic work tool system according to claim 1, further comprising an atmospheric pressure sensor, wherein the robotic work tool system is further configured to determine the change in weather by detecting a drop in pressure.

3. The robotic work tool system according to claim 1, wherein the charging station comprises a signal generator configured to transmit a control signal through the boundary wire as a number of periodic pulses for detection by the robotic work tool to determine boundaries of the working area.

4. The robotic work tool system according to claim 1, wherein the robotic work tool system is further configured to take the preservative action by the robotic work tool increasing a distance between the robotic work tool and the charging station.

5. The robotic work tool system according to claim 4, wherein the robotic work tool system is further configured to take the preservative action by seeking protection in a service area separate from the charging station.

6. The robotic work tool system according to claim 4, further comprising a memory for storing a map of a work area, wherein the robotic work tool system is further configured to take the preservative action by manoeuvring to a structure for seeking protection close to the structure, wherein the robotic work tool manoeuvres according to the map.

7. The robotic work tool system according to claim 6, wherein the robotic work tool system is further configured to take the preservative action by manoeuvring to a leeward side of the structure.

8. The robotic work tool system according to claim 1, wherein the robotic work tool system is further configured to take the preservative action by disabling the charging station.

9. The robotic work tool system according to claim 8, wherein the charging station is further configured to enter into an idle mode when disabled and wake up at intervals to detect changes in the weather or in response to receiving a wake up signal from the robotic work tool.

10. The robotic work tool system according to claim 1, wherein the robotic work tool system is further configured to take the preservative action by disabling the robotic work tool.

11. The robotic work tool system according to claim 10, wherein the robotic work tool system is further configured to enter the robotic work tool into an idle mode when disabled and wake up at intervals to detect changes in the weather or in response to receiving a wake up signal from the charging station.

12. The robotic work tool system according to claim 1, wherein the robotic work tool is a robotic lawnmower.

13. A method for use in a robotic work tool system comprising a charging station and a robotic work tool, the method comprising:
detecting, by magnetic field sensors of the robotic work tool, period current pulses in a boundary wire and an electrical charge buildup in the boundary wire;
determining a position of the robotic work tool relative to the boundary wire based on the detection of the periodic current pulses in the boundary wire;
determined an occurrence of a change in weather based on detection of the electrical charge buildup in the boundary wire being beyond a charge threshold;
in response to detection of the electrical charge buildup in the boundary wire beyond the charge threshold, taking a preservative action by the robotic work tool.

14. A robotic work tool system comprising:
a charging station equipped with a first barometer; and
a robotic work tool equipped with a second barometer;
wherein the robotic work tool system is configured to:
determine a change in weather, wherein being configured to determined a change in the weather comprises being configured to determine that the first barometer of the charging station indicates substantially a same change in atmospheric pressure as the second barometer of the robotic work tool; and
in response to determining the change in weather, take preservative action by the robotic work tool.

15. The robotic work tool system according to claim 14, further comprising a communication interface, wherein the robotic work tool system is further configured to determine the change in weather by receiving information from a weather service through the communication interface.

16. The robotic work tool system according to claim 14, further comprising a boundary wire, wherein the robotic work tool system is further configured to determine the change in weather by detecting an electrical charge buildup in the boundary wire.

17. The robotic work tool system according to claim 14, wherein the robotic work tool is further configured to take the preservative action by seeking protection in a service area separate from the charging station.

18. The robotic work tool system according to claim 14, further comprising a memory for storing a map of a work area, wherein the robotic work tool system is further configured to take the preservative action by manoeuvring to a structure for seeking protection close to the structure, wherein the robotic work tool manoeuvres according to the map.

19. The robotic work tool system according to claim 18, wherein the robotic work tool system is further configured to take the preservative action by manoeuvring to a leeward side of the structure.

20. The robotic work tool system according to claim 14, wherein the robotic work tool is further configured to take the preservative action by moving to the charging station and engaging with the charging station for charging the robotic work tool, the charging station comprising protective roofing and sides to provide shelter to the robotic work tool from weather conditions.

* * * * *